Aug. 15, 1961  
E. LORETAN  
2,996,339  
SHOCK-ABSORBING BEARING FOR MOVABLE ELEMENTS  
OF SMALL MECHANISMS  
Filed July 8, 1959
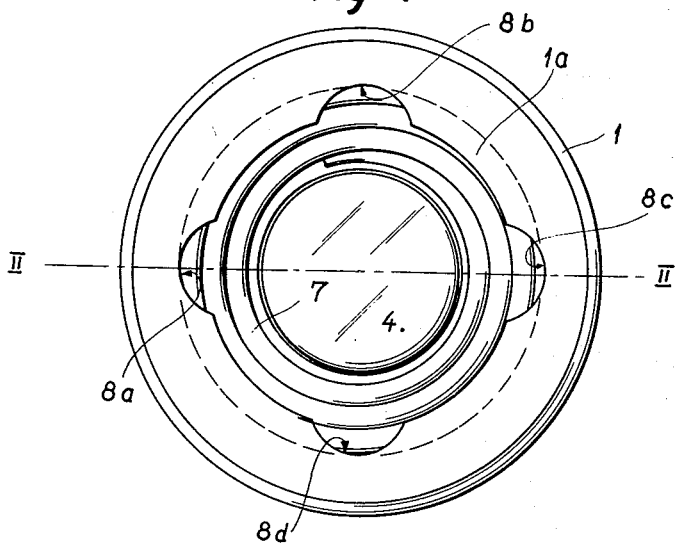
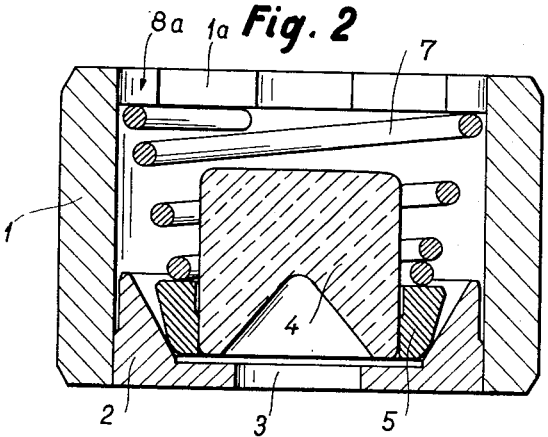
INVENTOR  
EDOUARD LORETAN  
BY John B. _____  
ATTORNEY

United States Patent Office 2,996,339
Patented Aug. 15, 1961

2,996,339
SHOCK-ABSORBING BEARING FOR MOVABLE ELEMENTS OF SMALL MECHANISMS
Edouard Loretan, Le Sentier, Switzerland, assignor to Parechoc S.A., Le Sentier, Switzerland, a Swiss firm
Filed July 8, 1959, Ser. No. 825,781
Claims priority, application Switzerland Oct. 10, 1958
1 Claim. (Cl. 308—159)

The present invention relates to a shock-absorbing bearing for the movable element of a small mechanism comprising a pivot bearing lodged with clearance within a tubular support, in which it is returned to a central position by means of a resilient device.

The said bearing is characterised by the fact that the resilient device comprises a coil spring of general frustoconical form bearing at least indirectly against the pivot bearing by means of its convolution of smallest diameter, and against an interval shoulder of the said support by its convolution of largest diameter, the said annular shoulder having at least one inlet permitting of gripping and disengaging the convolution of largest diameter of the spring for the purpose of dismantling the bearing.

The accompanying drawings show by way of example one constructional form of the subject of the invention.

FIGURE 1 is a plan view of a shock-absorbing bearing for the movable element of a small mechanism.

FIGURE 2 is a sectional view thereof along the line II—II of FIGURE 1.

The illustrated bearing comprises a tubular support 1 designed to be driven into the frame of the instrument on which the bearing is mounted. The said support has, at one of its ends, an internal annular shoulder 1a, while there is driven into its opposite end a plug 2 formed with a central hole 3 for the passage of the end of the shaft (not shown).

A stone pivot bearing 4 is disposed with clearance within the tubular support 1. The said pivot bearing is surrounded over a part of its height by a bezel 5 resting in a frustoconical seat 6 formed on the plug 2. A coil spring 7 returns the pivot bearing into the central position when it has been shifted by the shaft under the action of shocks to which the latter has been subjected.

The coil spring 7 is frustoconical, its smallest convolution bearing against the bezel 5, while its convolution of largest diameter bears against the shoulder 1a. The latter has four inlets 8a, 8b, 8c and 8d, which enable the spring to be disengaged without the plug 2 having to be removed. For this purpose, the terminal convolution of the spring is gripped by means of tweezers, which are introduced into one of the inlets 8, for example into the inlet 8a. The spring is slightly pushed towards the center until one-half of its terminal convolution is disengaged from the shoulder 1a. This terminal convolution is then obliquely positioned and penetrates into the two inlets 8b and 8d. Finally, it is sufficient to exert thereon a slight pull so that it is slightly deformed and completely leaves the shoulder 1a. The other convolutions, of smaller diameter than the terminal convolution readily follow. The diameter of the central aperture formed within the shoulder 1a is sufficient to enable the pivot bearing 4 surrounded by the bezel 5 to pass therethrough. The bearing can thus be dismantled even though the shoulder 1a is integrally formed with the support 1, without the plug 2 having to be separated from the support 1.

In addition, it is to be noted that, owing to the fact that the pivot bearing can pass through the rear central aperture in the support, the height of the bearing can be reduced in relation to the height of bearings of the same kind, without any detrimental effect on its operation.

In a modified form, the shoulder 1a may comprise only one inlet. This inlet will then have to be larger than the illustrated inlets 8. The spring will be removed by first disengaging the end of the terminal convolution and then turning it in the manner of a screw until it is freely disengaged.

What I claim is:

In a shock-absorbing bearing for the movable element of a small mechanism, a tubular support, a pivot bearing disposed with clearance within said tubular support, an internal shoulder of the said support, said shoulder being provided with three inlets, of which two are diametrically opposed, and a coil spring of general frustoconical form intended to return the said pivot bearing to its central position, said coil spring bearing at least indirectly against the pivot bearing by means of its convolution of smallest diameter, and against said internal shoulder by its convolution of largest diameter, the said diametrically opposed inlets permitting the passage of the said convolution of largest diameter of the spring while the third inlet serves for the introduction of a tool for gripping the said largest convolution, for the purpose of dismantling the bearing.

References Cited in the file of this patent

UNITED STATES PATENTS

| 1,843,868 | Copelin | Feb. 2, 1932 |
| 2,016,278 | Ehlers | Oct. 8, 1935 |
| 2,239,682 | Marti | Apr. 29, 1941 |
| 2,849,855 | Seitz | Sept. 2, 1958 |

FOREIGN PATENTS

| 302,442 | Switzerland | Dec. 16, 1954 |